United States Patent
Kodama et al.

(10) Patent No.: US 9,073,526 B2
(45) Date of Patent: Jul. 7, 2015

(54) BRAKE FLUID PRESSURE CONTROL DEVICE FOR VEHICLE

(75) Inventors: Takuro Kodama, Nagano (JP); Motoyasu Nakamura, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 1134 days.

(21) Appl. No.: 13/075,686

(22) Filed: Mar. 30, 2011

(65) Prior Publication Data

US 2011/0239641 A1    Oct. 6, 2011

(30) Foreign Application Priority Data

Mar. 31, 2010  (JP) ................ 2010-084107
Feb. 24, 2011  (JP) ................ 2011-037742
Feb. 24, 2011  (JP) ................ 2011-037743

(51) Int. Cl.
*B60T 8/36*    (2006.01)

(52) U.S. Cl.
CPC ................... *B60T 8/368* (2013.01)

(58) Field of Classification Search
CPC . B60T 8/3675; B60T 8/368; F15B 2201/405; F15B 2201/4056
USPC .............. 303/87, 119.3, DIG. 10, DIG. 11; 60/413, 416; 138/30, 31; 92/208, 212, 92/222
See application file for complete search history.

(56) References Cited

U.S. PATENT DOCUMENTS

| 3,058,374 A | 10/1962 | Miller |
| 3,595,449 A * | 7/1971 | Stump et al. .......... 222/386 |
| 4,799,048 A * | 1/1989 | Goshima et al. ......... 138/31 |
| 5,975,653 A | 11/1999 | Zaviska |
| 6,102,494 A | 8/2000 | Volz et al. |
| 6,142,751 A * | 11/2000 | Krauter et al. ........... 303/116.4 |
| 6,354,674 B1 * | 3/2002 | Iwamoto et al. .......... 303/119.3 |

(Continued)

FOREIGN PATENT DOCUMENTS

| EP | 1158179 A1 | 11/2001 |
| JP | 10281197 | 10/1998 |

(Continued)

OTHER PUBLICATIONS

Extended European Search Report for Application No. 11160598.6-2423 dated Jan. 31, 2013, 11 pages.

(Continued)

*Primary Examiner* — Thomas J Williams (74) *Attorney, Agent, or Firm* — Andrew M. Calderon; Roberts Mlotkowski Safran & Cole, P.C.

(57) ABSTRACT

A brake fluid pressure control device for a vehicle includes: a base body; reservoirs to store brake fluid in the base body; and a single lid member secured to the base body. The reservoir has a reservoir hole, a piston that slides inside the reservoir hole, and a spring that biases the piston. The lid member hermetically seals the reservoir holes. The lid member includes a plate member with which the springs make contact and a ring-shaped sealing member held between one face of the base body to which the plate member is secured and the other face of the plate member opposed to the one face to provide a sealing function. In the lid member, a screw hole is disposed outside a region surrounded by the sealing member and a communication passage communicating with the reservoir holes is provided inside the region.

21 Claims, 8 Drawing Sheets

(56) References Cited

U.S. PATENT DOCUMENTS

| | | | |
|---|---|---|---|
| 6,390,133 B1 | 5/2002 | Patterson et al. | |
| 7,118,183 B2* | 10/2006 | Hinz et al. | 303/DIG. 10 |
| 8,864,246 B2* | 10/2014 | Kodama et al. | 303/119.3 |
| 2004/0244371 A1* | 12/2004 | Takumori et al. | 60/591 |
| 2005/0034953 A1* | 2/2005 | Carne | 138/31 |
| 2005/0146210 A1 | 7/2005 | Hinz et al. | |
| 2009/0071286 A1* | 3/2009 | Ueno et al. | 267/168 |
| 2009/0212476 A1* | 8/2009 | Knebel et al. | 267/167 |

FOREIGN PATENT DOCUMENTS

| | | |
|---|---|---|
| JP | 11334565 | 12/1999 |
| JP | 2004338565 A | 12/2004 |
| JP | 2005516837 | 6/2005 |
| JP | 2008020061 | 1/2008 |
| JP | 2009085271 | 4/2009 |
| WO | WO-2009077249 A1 | 6/2009 |

OTHER PUBLICATIONS

Japanese Patent Office Action for Application No. 2011-037742, drafting date—Jul. 20, 2012, date of dispatch—Jul. 24, 2012, 7 pages total.

Japanese Patent Office Action for Application No. 2011-037743, drafting date—Jan. 29, 2013, 5 pages total.

* cited by examiner

FIG. 8B

BRAKE FLUID PRESSURE CONTROL DEVICE FOR VEHICLE

CROSS REFERENCE TO RELATED APPLICATION(S)

The present disclosure relates to the subject matters contained in Japanese Patent Application No. 2010-084107 filed on Mar. 31, 2010, Japanese Patent Application No. 2011-037742 filed on Feb. 24, 2011, and Japanese Patent Application No. 2011-037743 filed on Feb. 24, 2011, which are incorporated herein by reference in its entirety.

BACKGROUND

1. Field

The present invention relates to a brake fluid pressure control device for a vehicle capable of controlling brake fluid pressure applied to wheel brakes.

2. Description of the Related Art

Brake fluid pressure control devices for controlling brake fluid pressure acting on the wheel cylinders of wheel brakes have been used, and for example, a brake fluid pressure control device for a vehicle equipped with reservoirs for temporarily storing brake fluid discharged from wheel cylinders is known.

As this type of a brake fluid pressure control device for a vehicle, for example, JP-A-11-334565 discloses a brake fluid pressure control device having a hermetically sealed structure in which the opening portions of two reservoirs arranged in parallel on the bottom face of the main body of the device are hermetically sealed with caps individually. This brake fluid pressure control device is provided with a communication passage communicating with the plurality of reservoirs inside the main body thereof.

In addition, JP-A-2005-516837 discloses a fluid pressure unit having a single cover for closing the opening portions (holes for accommodating accumulators) of two reservoirs arranged in parallel on the bottom face of the housing thereof. The single cover is formed into a bowl shape. When the cover is mounted on the bottom face of the housing, the cover is disposed so as to protrude from the bottom face of the housing to the outside by a certain length.

Further, as this type of a brake fluid pressure control device for a vehicle, for example, JP-A-2005-516837 discloses a brake fluid pressure control device for a vehicle having a structure in which pistons (reservoir pistons) and springs are accommodated respectively into two reservoir holes arranged in parallel in the bottom face of the main body of the device and the reservoir holes are hermetically sealed with a cover.

However, in the brake fluid pressure control device disclosed in JP-A-11-334565, since the plurality of reservoirs are required to be covered with the caps individually, the number of components increases and the communication passage is required to be formed by cutting in the main body of the device. As a result, the cost of manufacturing rises sharply.

Furthermore, in the fluid pressure unit disclosed in JP-A-2005-516837, since the opening portions of the plurality of reservoirs are closed with the single cover, it is possible to avoid the problem of increasing the number of components. However, since the cover is disposed so as to protrude from the bottom face of the housing by the certain length, there occurs a problem that the housing is made larger in size and the installation space of the device mounted on a vehicle cannot be used effectively.

However, in the reservoir structure disclosed in JP-A-2005-516837, since the sliding length of the piston and the length of the spring are set long to ensure stable sliding operation of the piston, the reservoir itself is made larger in size, resulting in making the entire fluid pressure control device larger in size.

SUMMARY

In consideration of the above-mentioned circumstances, a first object of the present invention is to provide a brake fluid pressure control device for a vehicle capable of reducing the number of components, lowering the cost of manufacturing and contributing to miniaturization.

In consideration of the above-mentioned circumstances, a second object of the present invention is to provide a brake fluid pressure control device for a vehicle capable of making its reservoir (base body) smaller in size while ensuring the stable operation of the piston inside the reservoir hole.

With the first object in mind, there is provided a brake fluid pressure control device for a vehicle, the device including: a base body; a plurality of reservoirs configured to store brake fluid and provided in the base body, wherein the reservoirs are disposed in parallel; and a single lid member secured to the base body, wherein each of the reservoirs has a reservoir hole, a piston that slides inside the reservoir hole, and a spring that biases the piston, wherein the lid member hermetically seals the plurality of reservoir holes, wherein the lid member comprises a plate member with which the springs make contact and a ring-shaped sealing member held between one face of the base body to which the plate member is secured and the other face of the plate member opposed to the one face of the base body so as to provide a sealing function, wherein, in the lid member, a screw hole formed in the plate member and configured to secure the plate member to the base body is disposed outside a region surrounded by the sealing member, and a communication passage communicating with the plurality of reservoir holes is provided inside the region surrounded by the sealing member.

With the present invention, the lid member is formed of the plate member and the ring-shaped sealing member held between the one face of the base body and the other face of the plate member, the screw hole for securing the plate member to the base body is disposed outside the region surrounded by the sealing member, and the communication passage communicating with the plurality of reservoir holes are provided inside the region surrounded by the sealing member.

Hence, since the plurality of reservoir holes can be hermetically sealed with the single (common) lid member, the number of components can be reduced and the cost of manufacturing can be lowered. Furthermore, since the lid member is formed of the plate member, the lid member does not protrude more than necessary from the base body, whereby the lid member can seal the plurality of reservoir holes hermetically and securely via the ring-shaped sealing member engaged with the plate member, thereby contributing to the miniaturization of the device. Moreover, in the present invention, since the plurality of reservoir holes hermetically sealed with the plate member are provided so as to communicate with each other via the communication passage, compression resistance due to the air in each reservoir hole can be reduced in comparison with the prior art in which the reservoir holes are hermetically sealed with the covers individually provided for the reservoir holes.

In addition, the plate member may be provided with a long-side rib. When the plate member is secured to the base body, the long-side rib is formed so as to cover at least part of one side face of the base body extending from the one face of the base body. With this configuration, since the plate member can have a certain strength in the long-side direction thereof, and since the long side of the sealing member is covered with the long-side rib that is formed by simply bending the long side of the rectangular shape of the plate member, the sealing member disposed between the base body and the plate member can be protected effectively.

Furthermore, a short-side rib may be provided for the plate member. When the plate member is secured to the base body, the short-side rib is formed so as to make contact with the one face of the base body. With this configuration, the base body can be made waterproof in the short-side direction by simply bending the short side of the rectangular shape of the plate member. Moreover, since the short-side rib is made contact with the one face of the base body, the sealing member can be prevented from being deformed excessively by compression. Besides, the strength of the plate member in the short-side direction can be increased by the short-side rib.

In addition, frame portion for surrounding the screw hole may be provided. With this configuration, when the plate member is secured to the base body, the frame portion surrounding the screw hole make contact with the one face of the base body, whereby the compression amount of the sealing member can be restricted. Hence, the frame portions formed by simple processing can effectively prevent the sealing member from being compressed excessively. As a result, the durability of the sealing member can be improved, and the pressure on the sealing face of the ring-shaped sealing member can be maintained uniformly.

Furthermore, the base body may be provided with a respiratory hole, the open end of which faces the inside of the sealing member and communicates with the communication passage and through which gas passing through the communication passage flows in and out. With this configuration, the compressed air generated when the pistons slide along the reservoir holes can be preferably discharged to the outside via the communication passage and the respiratory hole.

Moreover, a vent hole passing through the base body may be formed so as to communicate with at least one of the inside of a motor and the inside of a housing, and the inside of the housing may be formed so as to communicate with the outside via a breathable waterproof member. With this configuration, ventilation can be achieved between the inside and the outside of the housing while the insides of the reservoirs are sealed hermetically and securely.

Besides, expanding portions expanding toward the deeper sides of the reservoirs may be formed on the flat face portion of the plate member. With this configuration, spring guides formed of the expanding portions can be provided on the plate member while the plate member is formed so as not to protrude from the bottom face of the base body. As a result, the base body can be made smaller in size while the springs are operated properly.

Still further, the winding beginning end portion and the winding terminating end portion of the spring are set at positions opposed to each other in a plan view from the axial direction of the spring. With this configuration, when the spring is deflected, the spring load generated at the beginning end portion is made equal to that generated at the terminating end portion. As a result, any unbalanced spring load applied to the piston can be suppressed, whereby it is possible to ensure stable sliding performance of the piston. The phrase "positions opposed to each other" means that the beginning end portion and the terminating end portion of the spring are disposed at regions different from each other while a reference face passing through the axis line of the spring is used as a reference.

In addition, the seat for receiving the spring may be provided at a position in the range of a sealing groove formed in the piston in the axial direction of the piston. With this configuration, the spring can be operated at a position close to the position wherein a sliding sealing member is provided. As a result, twisting of the piston can be minimized, and a stable spring force can be applied to the piston.

Furthermore, the piston may be formed into a flat shape in which the sliding length thereof is set so as to be smaller than the radius thereof. With this configuration, the length of the reservoir hole in the axial direction can be shortened, and the base body can be made compact in size. In this case, the reservoir can be made compact in size by virtue of the synergistic effect of the flat shape of the piston and the fact that the spring load at the beginning end portion of the spring is made equal to that at the terminating end portion thereof owing to the phase difference between the beginning end portion and the terminating end portion.

Moreover, the sealing groove may be formed at the intermediate position in the axial direction of the piston on its sliding face. With this configuration, the piston can be slid stably along the reservoir hole. Even if the piston is made compact in size, tilting and twisting of the piston can be minimized. The "intermediate position" is a central portion excluding the end portions of the sliding face of the piston.

Besides, an inner coil spring and an outer coil spring may be used as the spring of the device, and the inner coil spring and the outer coil spring may be disposed coaxially and doubly on the inner circumferential side and the outer circumferential side thereof. With this configuration, the required deflection amounts of the inner coil spring and the outer coil spring in the axial direction can be made smaller than that of a single coil spring. As a result, the reservoir can be made more compact in size, and the inner coil spring and the outer coil spring can be operated properly for the piston.

Still further, a step portion may be formed between an inner seat for receiving the inner coil spring and an outer seat for receiving the outer coil spring. With this configuration, the inner coil spring can be restricted from moving in a direction nearly perpendicular to the axial direction. As a result, the inner coil spring and the outer coil spring can deliver stable spring forces while the coil springs are prevented from making contact with each other.

With the second object in mind, there is provided a brake fluid pressure control device for a vehicle, the device including: a base body; a reservoir configured to store brake fluid and provided in the base body, wherein the reservoir has a reservoir hole, a piston that slides inside the reservoir hole, a coil spring that biases the piston, and a spring receiving member that receives the coil spring, wherein the piston is formed into a flat shape in which a sliding length of the piston is set to be smaller than the radius of the piston, wherein a winding beginning end portion and a winding terminating end portion of the coil spring are set at positions opposed to each other in a plan view from the axial direction of the coil spring.

With this configuration, the winding beginning end portion and the winding terminating end portion of the coil spring are set at positions opposed to each other in a plan view from the axial direction of the coil spring. With this configuration, when the coil spring is deflected, the spring load generated at the beginning end portion is made equal to that generated at the terminating end portion. As a result, any unbalanced spring load applied to the piston can be suppressed, whereby it is possible to ensure stable sliding performance of the piston. The phrase "positions opposed to each other" means that the beginning end portion and the terminating end portion of the spring are disposed at regions different from each other while a reference face passing through the axis line of the coil spring is used as a reference.

In addition, the piston may be formed into a flat shape in which the sliding length thereof is set so as to be smaller than the radius thereof. With this configuration, the length of the reservoir hole in the axial direction can be shortened, and the base body can be made compact in size. In this case, the reservoir can be made compact in size by virtue of the synergistic effect of the flat shape of the piston and the fact that the spring load at the beginning end portion of the spring is made equal to that at the terminating end portion thereof owing to the phase difference between the beginning end portion and the terminating end portion.

Furthermore, the seat for receiving the spring may be provided at a position in the range of a sealing groove formed in the piston in the axial direction of the piston. With this configuration, the spring can be operated at a position close to the position wherein a sliding sealing member is provided. As a result, twisting of the piston can be minimized, and a stable spring force can be applied to the piston.

Moreover, the sealing groove may be formed at the intermediate position in the axial direction of the piston on its sliding face. With this configuration, the piston can be slid stably along the reservoir hole. Even if the piston is made compact in size, tilting and twisting of the piston can be minimized. The "intermediate position" is a central portion excluding the end portions of the sliding face of the piston.

Besides, expanding portions expanding toward the deeper sides of the reservoirs may be formed on the flat face portion of the plate member. With this configuration, spring guides formed of the expanding portions can be provided on the plate member while the plate member is formed so as not to protrude from the bottom face of the base body. As a result, the base body can be made smaller in size while the springs are operated properly for the pistons.

According to a first aspect of the present invention, there is provided a brake fluid pressure control device for a vehicle capable of reducing the number of components, lowering the cost of manufacturing and contributing to miniaturization.

According to a second aspect of the present invention, there is provided a brake fluid pressure control device for a vehicle capable of making its reservoir (base body) smaller in size while ensuring the stable operation of the piston inside the reservoir hole.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

FIG. 7 is an enlarged plan view of the spring, showing the phase difference between the beginning end portion and the terminating end portion thereof.

DETAILED DESCRIPTION OF THE EMBODIMENT(S)

Best modes for carrying out the present invention will be described below in detail referring to the accompanying drawings.

Figure 1:
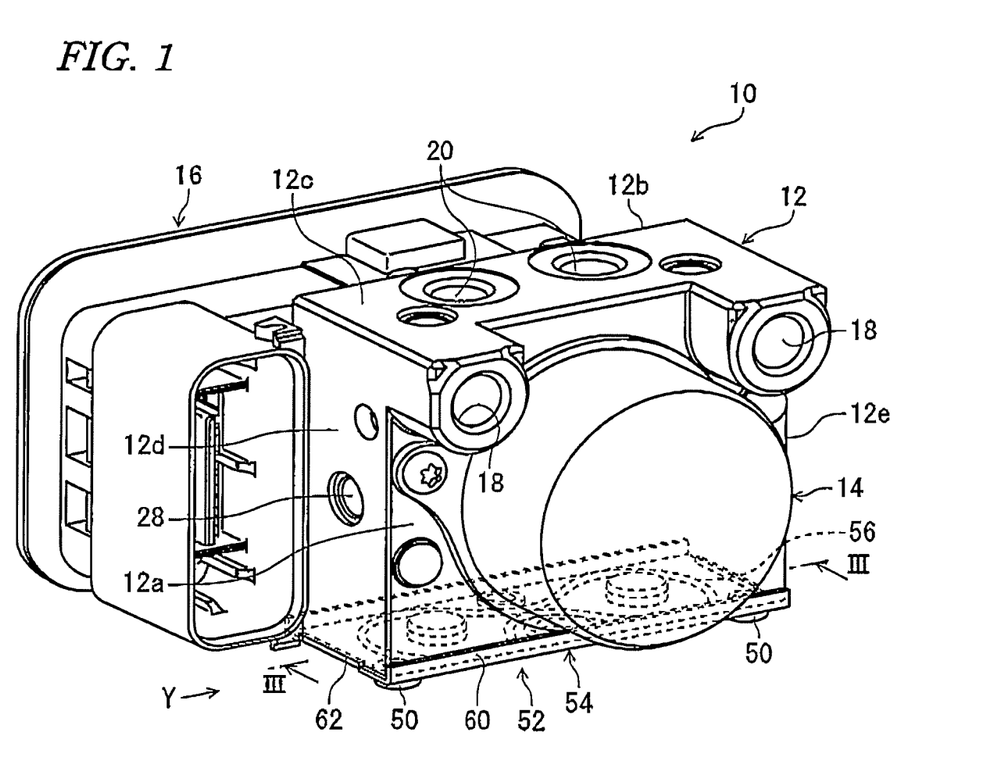
FIG. 1 is a perspective view showing a brake fluid pressure control device for a vehicle according to an embodiment of the present invention.

As shown in FIG. 1, a brake fluid pressure control device for a vehicle 10 (hereafter referred to as a "brake control device") according to an embodiment of the present invention is preferably used for vehicles, such as motorcycles, motor tricycles, all-terrain vehicles (ATVs) and four-wheel automobiles, to control a braking force (brake fluid pressure) applied to the wheels of such a vehicle as necessary. In the following descriptions, an example in which the brake control device 10 is applied to a motorcycle (not shown) will be explained. However, this does not mean that vehicles on which the brake control device 10 is mounted are limited to motorcycles.

As shown in FIG. 1, the brake control device 10 is basically equipped with a base body 12 on which various members, such as solenoid valves described later, are mounted, a motor 14 and a control housing (housing) 16, and these are integrally assembled into a unit. The motor 14 is mounted on one side face 12a of the base body 12, the side face 12a extending in the lateral direction of the base body 12 that is formed into a nearly rectangular parallelepiped shape. On the other hand, the control housing 16 is mounted on the other side face 12b of the base body 12, the side face 12b being on the opposite side of the one side face 12a. An electronic control unit and electrical components (not shown) are accommodated therein.

A pair of inlet ports (connection ports) 18 and 18 is formed so as to be open at the left and right upper end portions of the one side face 12a of the base body 12 on which the motor 14 is mounted. In addition, a pair of outlet ports (connection ports) 20 and 20 is formed so as to be open on the upper face 12c of the base body 12.

Figure 3:
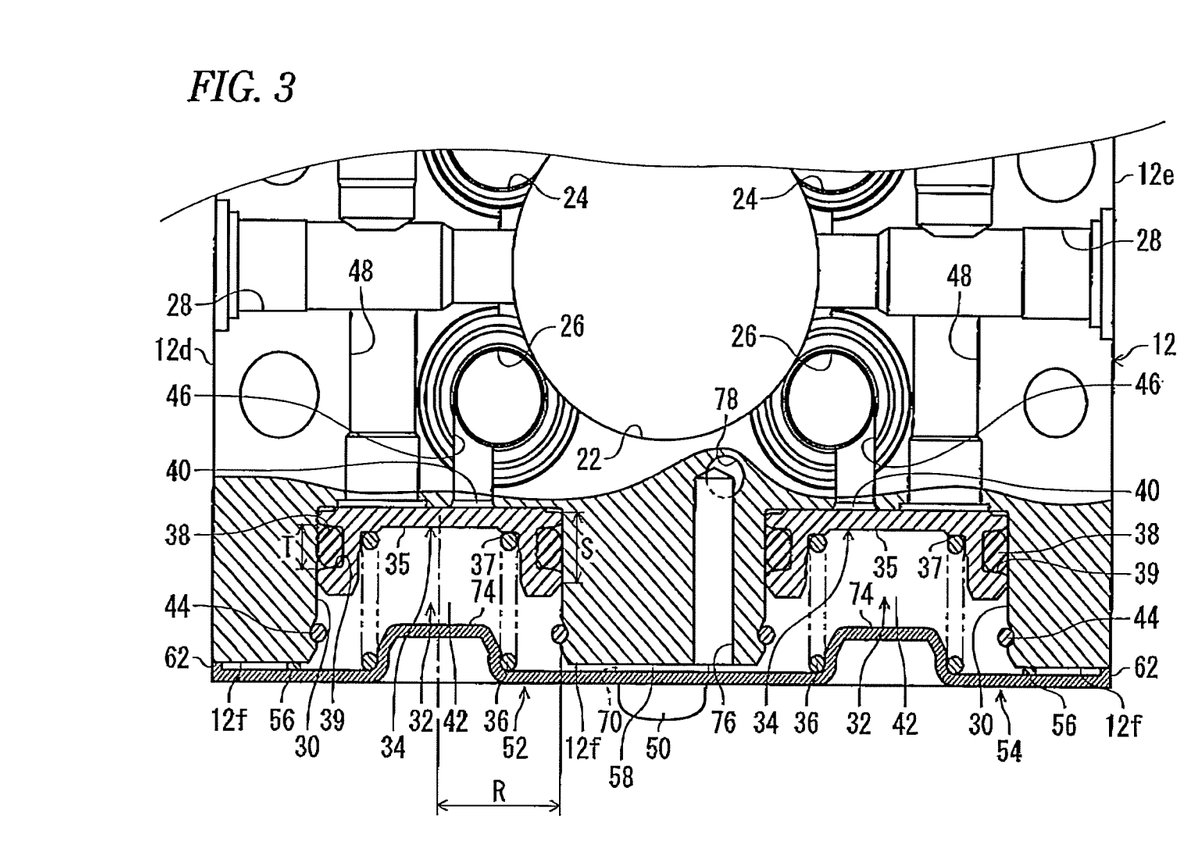
FIG. 3 is a partly sectional perspective view taken on line III-III of FIG. 1, showing internal mechanisms.

The base body 12 is formed of a metallic member having a nearly rectangular parallelepiped shape. Fluid passages (not shown) through which brake fluid (a kind of fluid) flows and a motor mounting hole 22 (see FIG. 3) in which the motor 14 is installed are formed inside the base body 12. Furthermore, a set of inlet valves (not shown) each formed of a normally open solenoid valve and respectively inserted into a set of inlet valve mounting holes 24 and 24 arranged in parallel and a set of outlet valves (not shown) each formed of a normally closed solenoid valve and respectively inserted into a set of outlet valve mounting holes 26 and 26 arranged in parallel are disposed inside the base body 12 as shown in FIG. 3. Moreover, inside the base body 12, pumps (not shown) are mounted through a set of pump mounting holes 28 and 28 formed in the left and right side faces 12d and 12e of the base body 12.

Pipes (not shown) from a fluid pressure source (not shown), such as a master cylinder, are connected to the inlet ports 18 and 18, and the brake fluid is introduced from the fluid pressure source. In addition, the inlet ports 18 and 18 are provided so as to communicate with the inlet valve mounting holes 24 and 24 via fluid passages (not shown). Pipes (not shown) leading to wheel brakes are connected to the outlet ports 20 and 20. The outlet ports 20 and 20 are provided so as to communicate with the inlet valve mounting holes 24 and 24 and the outlet valve mounting holes 26 and 26 via fluid passages (not shown).

As shown in FIG. 3, a pair of reservoirs 32 and 32 is disposed in parallel on the bottom face 12*f* of the base body 12. These reservoirs 32 and 32 have a function of temporarily storing the brake fluid (i.e., the brake fluid flowing out from the wheel cylinder sides of the wheel brakes) that is released through communication passages communicating with the fluid passages of the base body 12 by opening the output valves (solenoid valves) at the time of the pressure reduction control of the wheel brakes.

The pair of reservoirs 32 and 32 has the same configuration and is equipped with reservoir holes 30 and 30 each having a bottomed cylinder shape and an open end in the bottom face 12*f* of the base body 12; pistons 34 and 34 that move slidably along the reservoir holes 30 and 30; and springs (compression coil springs) 36 and 36 for biasing the pistons 34 and 34 toward the outlet valve mounting holes 26 and 26 (upward in FIG. 3).

Figure 7A:
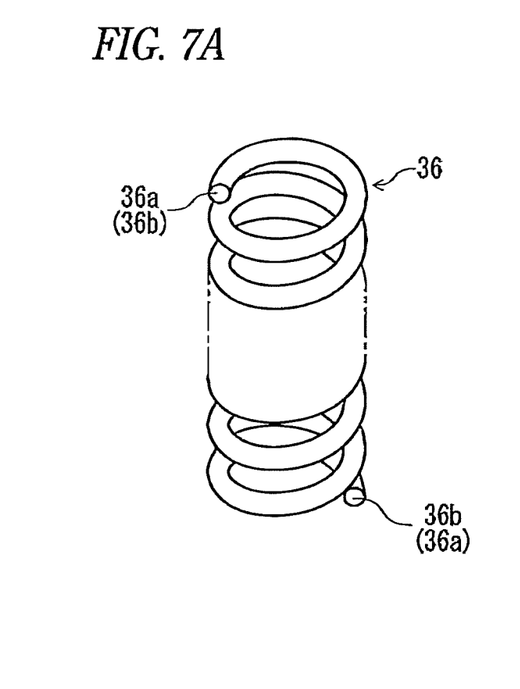
FIG. 7A is a perspective view of the spring shown in FIG. 3.
Figure 7B:
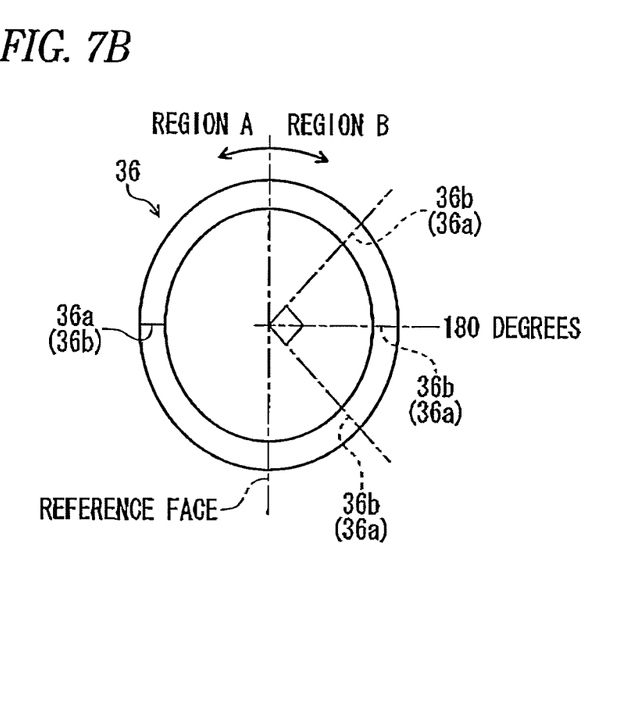

FIG. 7A is a perspective view of the spring shown in FIG. 3, and FIG. 7B is an enlarged plan view of the spring, showing the phase difference between the beg inning end portion and the terminating end portion of the spring.

As shown in FIG. 7B, the winding beginning end portion 36*a* and the winding terminating end portion 36*b* of the spring 36 are disposed at positions opposed to each other in a plan view in the direction of the axis passing through the center of the spring 36. In this case, the phrase "positions opposed to each other" means that the beginning end portion 36*a* and the terminating end portion 36*b* of the spring 36 are disposed at regions (A and B) different from each other while a reference face passing through the axis line of the spring 36 is used as a reference.

As shown in FIG. 7B, the beginning end portion 36*a* and the terminating end portion 36*b* of the spring 36 are set at positions in which the phases of the winding angles thereof are different from each other by approximately 180 degrees. This will be described later in detail.

The piston 34 is formed into a flat shape such that the sliding length (the length in the axial direction) of the piston 34 is shorter than the maximum radius (R) of the piston 34 (S<R) as shown in FIG. 3. This will also be described later in detail.

The upper end portion of the spring 36 is engaged with a spring seat (seat) 37 formed on the lower face portion 35 of the piston 34. On the other hand, the lower end portion of the spring 36 is engaged with each of expanding portions 74 and 74 formed on a plate member 54 described later and protruding toward the deeper sides of the reservoir holes 30 and 30.

A ring-shaped sealing groove 39 is formed around the outer circumferential face of the piston 34, and a piston packing (sealing member) 38 is installed in the sealing groove 39. The sealing groove 39 is formed at an intermediate position in the axial direction of the piston 34 on the sliding face thereof. This will also be described later in detail.

The reservoir hole 30 is divided by the piston packing 38 into a fluid pressure chamber 40 which is located on the upper side and into which the brake fluid is introduced and a gas chamber 42 in which the spring 36 is disposed. In addition, C-shaped clips 44, 44 are installed on the inner circumferential faces of the reservoir holes 30, 30. The C-shaped clip 44 makes contact with the outer circumferential face on the lower end side of the piston 34 via a ring-shaped concave portion.

The fluid pressure chamber 40 is provided so as to communicate with the outlet valve mounting hole 26 via a first passage 46 extending in the up-down direction and to communicate with the pump mounting hole 28 via a second passage 48 extending in parallel with the first passage 46.

Figure 2:
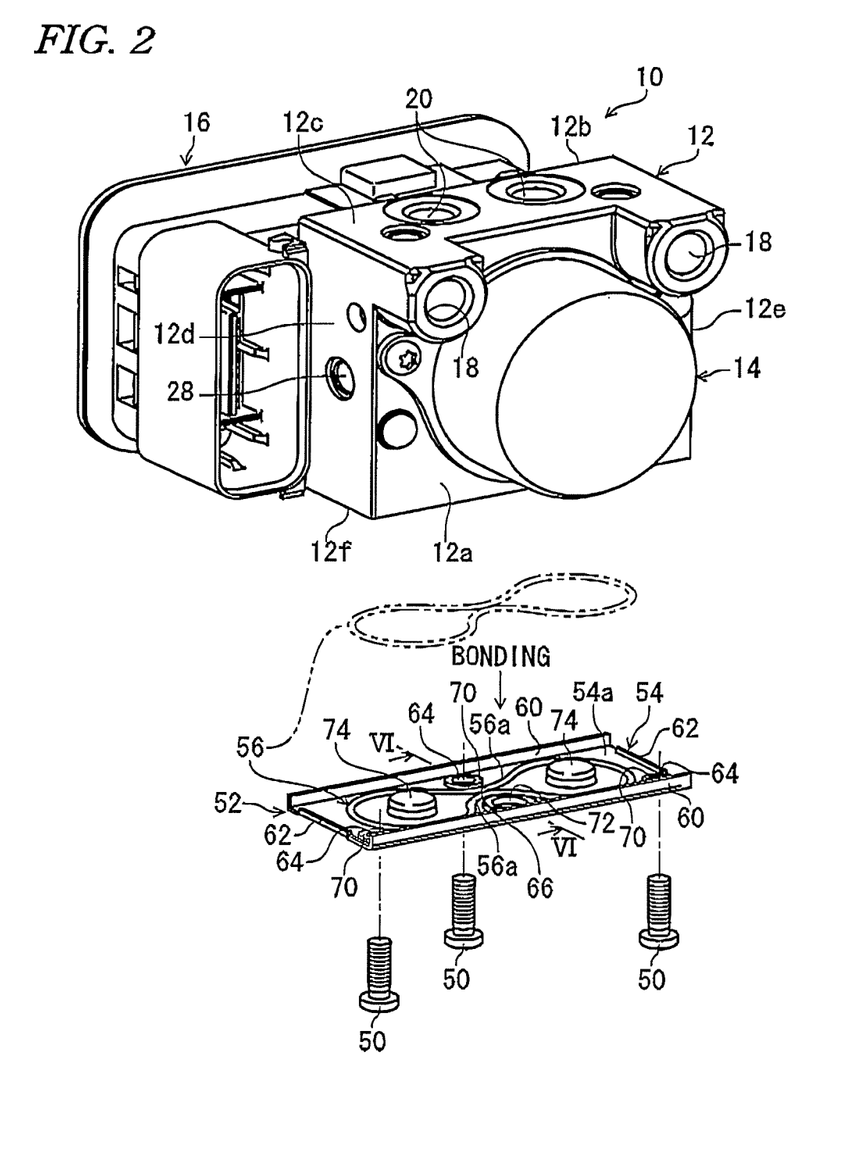
FIG. 2 is an exploded perspective view with a lid member removed from the brake fluid pressure control device for a vehicle shown in FIG. 1.

Furthermore, as shown in FIG. 2, a single lid member 52 for hermetically sealing the plurality of reservoir holes 30 and 30 is secured to the bottom face 12*f* of the base body 12 via a plurality of screw members 50. This lid member 52 is equipped with the plate member 54 with which the lower end portions of the springs 36 and 36 make contact; and a ring-shaped sealing member (seal ring) 56 disposed between the bottom face 12*f* (one face) of the base body 12 to which the plate member 54 is secured and the upper face 54*a* (the other face) of the plate member 54 opposed to the bottom face 12*f* (one face) of the base body 12.

Although an example in which the lid member 52 is secured to the bottom face 12*f* of the base body 12 is given in this embodiment, the present invention is not limited to this example. For example, the lid member 52 may be secured to, for example, one side face 12*a* or the other side face 12*b* of the base body 12. In this case, the reservoirs 32 and 32 (the reservoir holes 30 and 30) are provided on the one side face 12*a* or the other side face 12*b* of the base body 12.

Figure 4A:
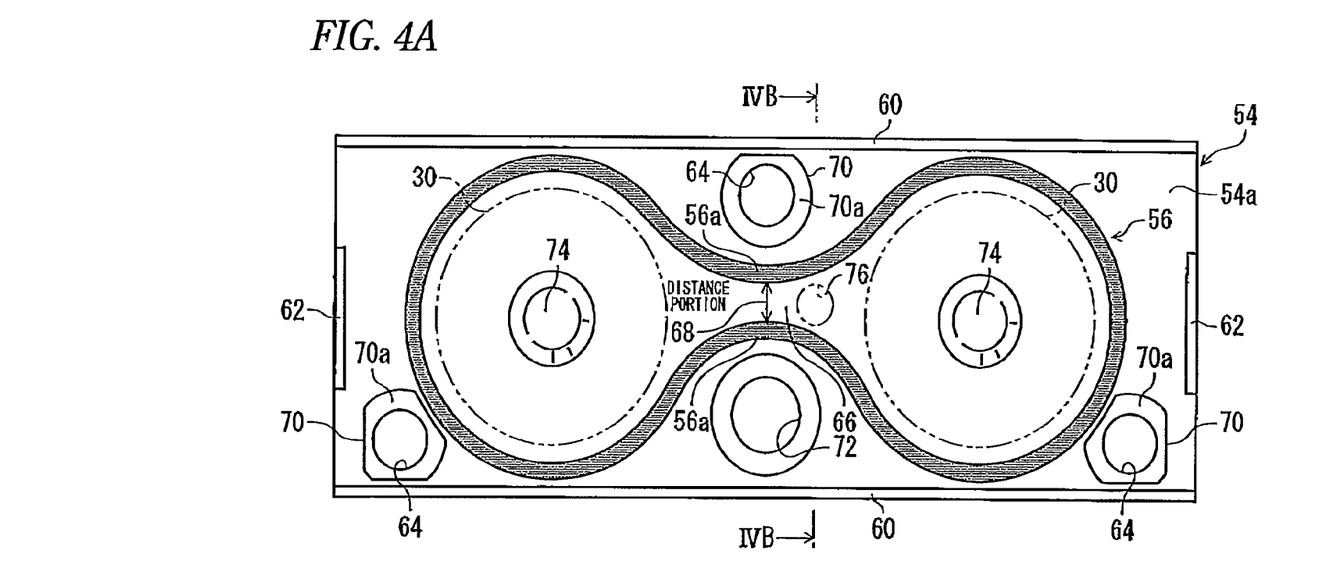
FIG. 4A is a plan view showing the lid member shown in FIG. 2.

As shown in FIG. 4A, the ring-shaped sealing member 56 is disposed in a shape similar to that of a pair of glasses along the flat upper face 54*a* of the plate member 54 and secured to the upper face 54*a* of the plate member 54 using an adhesive, for example.

The sealing member 56 is formed of, for example, a metal gasket, a metal gasket coated with rubber on the surface, a paper gasket, an elastic member made of rubber or the like, or a fluid sealant formed of a fluid gasket, such as a silicone-based gasket. The sealing member 56 is held between the bottom face 12*f* of the base body 12 and the upper face 54*a* of the plate member 54, thereby providing a sealing function.

As shown in FIG. 3, a clearance portion 58 is formed between the central portion of the bottom face 12*f* of the base body 12 and the upper face 54*a* of the plate member 54. This clearance portion 58 will be described later.

As shown in FIG. 4A, the plate member 54 is formed into a rectangular flat plate in a plan view. This plate member 54 has long-side ribs 60 and 60 formed by upward bending both the side end portions of the long sides thereof extending in the long-side direction and has short-side ribs 62 and 62 formed by upward bending both the end portions of the short sides thereof extending in the short-side direction perpendicular to the long-side direction, the both the end portions of the short sides being provided in the axial direction of the plate member 54.

In this embodiment, both the long sides and both the short sides of the rectangular plate member 54 are bent so that the pair of long-side ribs 60 and 60 is opposed to each other and so that the pair of short-side ribs 62 and 62 is opposed to each other. However, it may be possible that at least one of the long sides is bent to form the long-side rib 60 and that at least one of the short sides is bent to form the short-side rib 62. The plate member 54 is preferably formed of, for example, a thin metal plate or a resin material.

Figure 5:
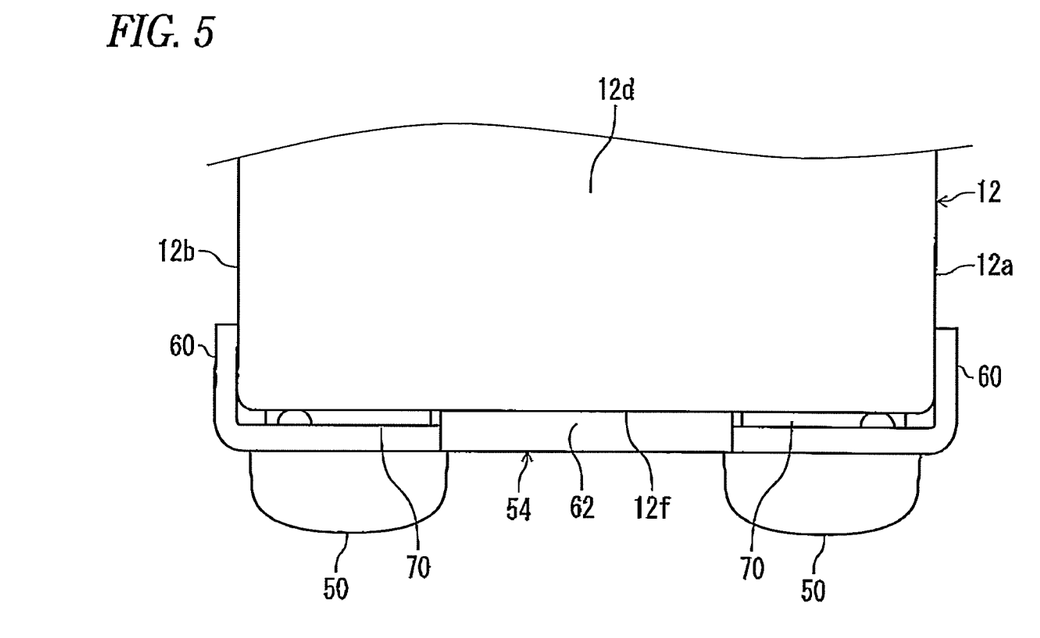
FIG. 5 is a view seen from arrow Y of FIG. 1.

When the plate member 54 is secured to the bottom face 12*f* of the base body 12 with the plurality of screw members 50, the long-side ribs 60 and 60 are formed so as to partly cover the lower sides of both the side faces 12*a* and 12*b* extending from the bottom face 12*f* (one face) of the base body 12 as shown in FIG. 5. In addition, when the plate member 54 is secured to the bottom face 12f of the base body 12 with the screw members 50, the short-side ribs 62 and 62 are provided so as to make contact with the bottom face 12f of the base body 12.

Furthermore, the plate member 54 has a plurality of screw holes 64 for allowing the screw members 50 to be inserted is formed at three positions: two corner positions where one of the long-side ribs 60 and 60 intersects the short-side ribs 62 and 62, and one position at the central region of one of the long sides. The plurality of screw holes 64 are disposed outside the region surrounded by the ring-shaped sealing member 56. On the other hand, a communication passage 66 communicating with the plurality of reservoir holes 30 and 30 is provided inside the region surrounded by the ring-shaped sealing member 56.

The communication passage 66 is formed of the clearance portion 58 (see FIG. 3) formed by a distance space between the central flat face of the bottom face 12f of the base body 12 and the flat upper face 54a of the plate member 54 in the up-down direction (vertical direction); and a distance portion 68 (see FIG. 4) that is a region surrounded by the ring-shaped sealing member 56 in the horizontal direction and formed such that circular portions 56a and 56a constituting parts of the sealing member 56 are separated from each other by a certain distance in the lateral direction (horizontal direction).

Figure 6A:
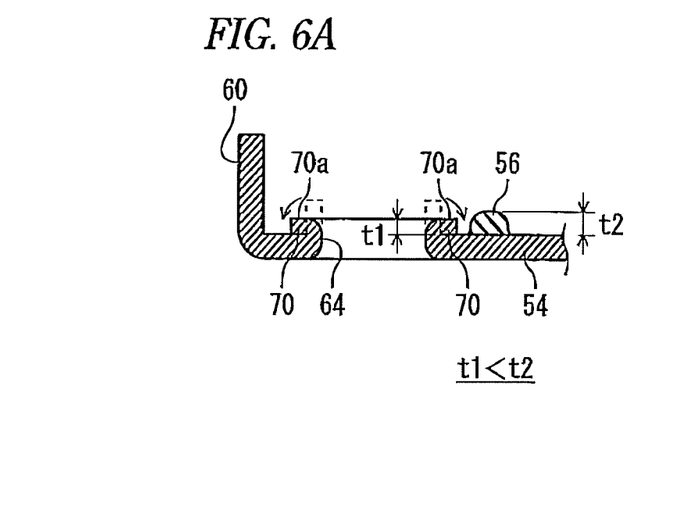
FIG. 6A is a partly omitted vertical sectional view taken on line VI-VI of FIG. 2.

Moreover, as shown in FIG. 6A, a disc-shaped frame portion 70 surrounding the screw hole 64 is provided around the screw hole 64. The frame portion 70 is formed as described below: a protruding portion (refer to the portion indicated by broken lines) protruding in a nearly cylindrical shape is formed by performing burring processing with, for example, a punch (not shown), and the protruding portion is folded back toward the radially outward direction using another punch (not shown) so as to be made close contact with the upper face 54a of the plate member 54.

Figure 6B:
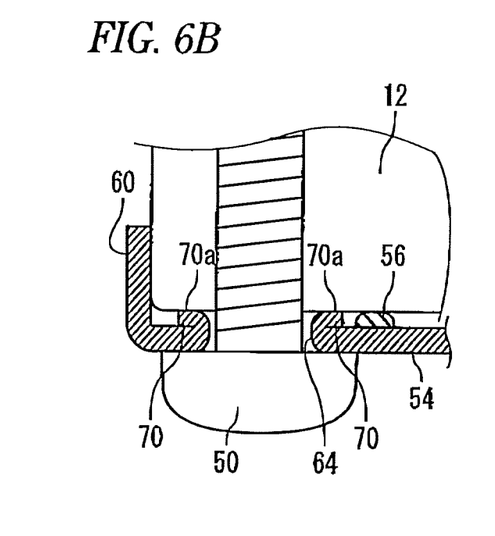
FIG. 6B is a partly omitted vertical sectional view showing a state in which a plate member is secured with a screw member.

The upper face of the frame portion 70 is formed of a flat face and functions as a seat face 70a making contact with the bottom face 12f of the base body 12 when the plate member 54 is secured to the bottom face 12f of the base body 12. The height dimension (upward protruding dimension) of the seat face 70a of the frame portion 70 is set so as to be equal or nearly equal to the height dimension of the short-side rib 62. Furthermore, the height dimension t1 (upward protruding dimension) of the seat face 70a of the frame portion 70 is set so as to be smaller than the height dimension t2 of the sealing face of the sealing member 56 when the sealing member 56 is in its non-compressed state (t1<t2) as shown in FIG. 6A. Hence, as shown in FIG. 6B, the seat face 70a of the frame portion 70 makes contact with the bottom face 12f (one face) of the base body 12, whereby the screwing amount of the screw member 50 is limited and the compression amount of the sealing member 56 is restricted.

Moreover, a circular through hole 72 passing through the upper and lower faces of the plate member 54 is formed in the plate member 54. This through hole 72 functions as a communication passage leading to a vehicle mounting screw hole (not shown) provided in the bottom face 12f of the base body 12. The height dimension of the frame portion surrounding the through hole 72 is also set so as to be nearly equal to that of the frame portion 70 of the screw hole 64, whereby the compression amount of the sealing member 56 is securely restricted by the frame portion of the through hole 72 together with the seat faces 70a.

Still further, the expanding portions 74 and 74 engaged with the lower end portions of the springs 36 and 36 so as to function as spring guides are provided on the flat upper face (flat face portion) 54a of the plate member 54. These expanding portions 74 and 74 do not protrude toward the lower face of the plate member 54 but protrude toward the deeper sides of the reservoir holes 30 and 30.

Since the expanding portions 74 and 74 protruding toward the deeper sides of the reservoir holes 30 and 30 are provided on the flat upper face (flat face portion) 54a of the plate member 54 as described above, the plate member 54 does not protrude from the bottom face 12f of the base body 12, and spring guides formed of the expanding portions 74 and 74 can be provided on the plate member 54. As a result, the base body 12 can be made smaller in size while the springs 36 and 36 are operated properly.

Figure 4B:
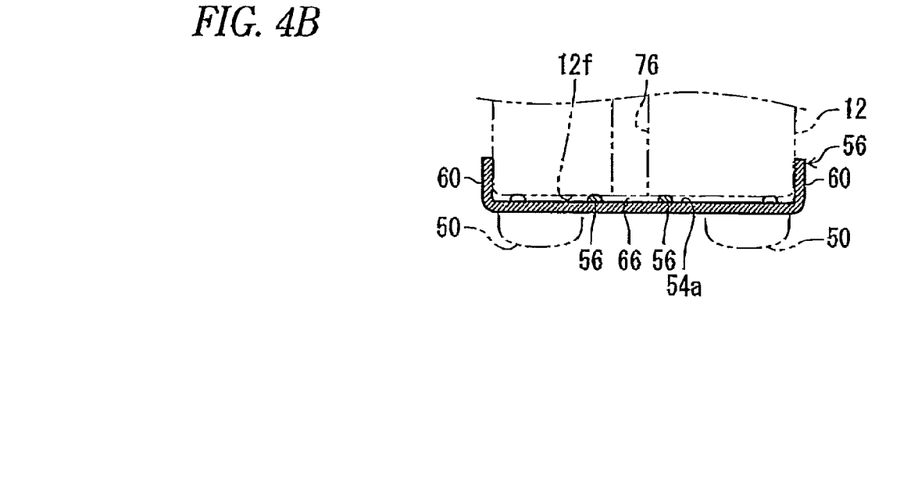
FIG. 4B is a vertical sectional view taken on line IVB-IVB of FIG. 4A.

As shown in FIG. 4B, the base body 12 is provided with a respiratory hole 76, the open end of which faces the inside of the sealing member 56 and communicates with the communication passage 66 and through which air passing through the communication passage 66 flows in and out. This respiratory hole 76 is provided so as to be open near the central portion of the bottom face 12f of the base body 12, to extend upward from its open end and to communicate with a vent hole 78 passing through the base body 12 in the lateral direction.

This vent hole 78 communicates with at least one of the control housing 16 and the motor 14 (both of the control housing 16 and the motor 14 in this embodiment).

In this embodiment, although the plate member 54 is screwed to the bottom face 12f of the base body 12 via the plurality of screw members 50, it may be possible, for example, that the edge portions of the plate member 54 are swaged so as to be secured to the base body 12 or that the plate member 54 is press-fitted into a groove portion (not shown) formed in the bottom face 12f of the base body 12.

Furthermore, in this embodiment, although the sealing member 56 is positioned on the upper face 54a of plate member 54 and bonded thereto, it may be possible, for example, that the sealing member 56 is provided so as to be held and engaged between the bottom face 12f of the base body 12 and the upper face 54a of the plate member 54 or that engaging portions (not shown) are provided on the upper face 54 of the plate member 54 and engaged with the sealing member 56.

Vent passages (not shown) communicating with the outside are formed in the control housing 16, and the vent passages are each provided with a moisture permeable waterproof element (breathable waterproof member) (not shown) that prevents the transport of moisture while allowing the transport of air. It is preferable, for example, that a known product under the trade name of GORE-TEX (registered trademark) be used as this moisture permeable waterproof element. The moisture permeable waterproof element, when provided, can prevent the entry of moisture, dust, etc. into the internal space of the control housing 16.

In this embodiment, the vent hole 78 formed so as pass through the base body 12 communicates with the inside of the motor 14 and the inside of the control housing 16, and the inside of the control housing 16 communicates with the outside via the breathable waterproof member. Hence, the pressure inside the gas chamber 42 can be maintained at atmospheric pressure while the insides of the reservoirs 32 and 32 are sealed hermetically and securely with the sealing member 56.

The brake control device 10 according to the embodiment of the present invention is basically configured as described above, and the operation and working effects of the device will be described below.

At the time of the pressure reduction control of the wheel brakes, for example, at the time of anti-lock brake control, when the output valve directly communicating with the output port 20 is opened, the brake fluid tends to flow into the fluid pressure chamber 40 of the reservoir 32 via the first passage 46 that communicates with the outlet valve mounting hole 26 in which the output valve is mounted.

At this time, the piston 34 is pressed by the brake fluid introduced into the fluid pressure chamber 40, and the piston 34 is pressed against the spring force of the spring 36 and is moved toward the plate member 54. Hence, the brake fluid is allowed to flow into the fluid pressure chamber 40, and the volume of the brake fluid corresponding to the movement distance of the piston 34 along the reservoir hole 30 is stored. Although the capacity of the gas chamber 42 is reduced when the piston 34 is moved, since the communication passage 66 communicates with the control housing 16, etc. communicating with the atmosphere via the respiratory hole 76 and the vent hole 78, the internal pressure therein does not rise.

On the other hand, in the case that anti-lock brake control is performed, the motor 14 is driven and rotated using a drive signal output from the electronic control unit (not shown) accommodated inside the control housing 16. When the motor 14 is driven and rotated, the pump (not shown) mounted in the pump mounting hole 28 operates, and the brake fluid stored inside the fluid pressure chamber 40 of the reservoir 32 passes through the second passage 48 and flows out, thereby being returned to a fluid passage (not shown) inside the base body 12. At that time, the piston 34 is pressed in a direction of moving away from the plate member 54 by virtue of the spring force of the spring 36, and the capacity of the fluid pressure chamber 40 is reduced, whereby the piston 34 is returned to its initial state.

Next, the pair of reservoirs 32 and 32 will be described below in detail. Since the reservoirs 32 and 32 have the same configuration, one of the reservoirs 32 and 32 will be described, and the descriptions of the other reservoir 32 are omitted.

FIG. 7A is a perspective view showing the compression coil spring shown in FIG. 3, and FIG. 7B is an enlarged plan view of the compression coil spring, showing the phase difference between the beginning end portion and the terminating end portion thereof.

As shown in FIGS. 7A and 7B, the winding beginning end portion 36a and the winding terminating end portion 36b of the spring 36 are set at positions opposed to each other in the radial direction (positions in which the phases of the winding angles thereof are different by approximately 180 degrees). In this case, it is preferable that the phase difference in winding angle be set, for example, in the range of 180±45 degrees (the phase difference is in the range of 135 to 225 degrees) (see the range indicated by the dashed lines of FIG. 7B).

In the case that the phases of the winding angles of the winding beginning end portion 36a and the winding terminating end portion 36b are set so as to be different from each other by approximately 180 degrees, when the spring 36 is deflected, the spring load generated at the beginning end portion 36a is made equal to that generated at the terminating end portion 36b. As a result, any unbalanced spring load applied to the piston 34 can be suppressed, whereby it is possible to ensure stable sliding performance of the piston 34. It is preferable that the number of effective turns of the spring 36 be set so as to be increased from 0.5 turns in increments of 1 turn (0.5 turns, 1.5 turns, 2.5 turns, 3.5 turns, ...).

As shown in FIG. 3, the spring seat 37 for receiving the spring 36 is provided on the lower face portion 35 of the piston 34 that is opposed to the expanding portion 74.

In this embodiment, the spring 36 can be restricted from moving in a direction nearly perpendicular to the axial direction (the play of the spring in the left-right direction in FIG. 3 can be restricted) by virtue of the spring seat 37 of the piston 34 and the expanding portion 74 of the plate member 54. As a result, the positional displacement of the spring 36 can be avoided, and the spring 36 can deliver a stable spring force.

As shown in FIG. 3, the piston 34 sliding along the reservoir hole 30 is formed into a flat shape in which the sliding length (the length in the axial direction) (S) of the piston 34 is set so as to be smaller than the maximum radius (R) of the piston 34 (S<R).

In this embodiment, since the sliding length (S) of the piston 34 is set so as to be smaller than the maximum radius (R) of the piston 34 (S<R), the length of the reservoir hole 30 in the axial direction can be shortened, and the base body 12 can be made compact in size. In this case, the reservoir 32 can be made compact in size by virtue of the synergistic effect of the flat shape of the piston 34 and the fact that the spring load at the beginning end portion 36a of the spring 36 is made equal to that at the terminating end portion 36b thereof owing to the phase difference between the beginning end portion 36a and the terminating end portion 36b.

Furthermore, the sealing groove 39 for accommodating the piston packing 38 is formed in the piston 34. More specifically, the sealing groove 39 is formed at the intermediate position in the axial direction of the piston 34 on its sliding face making sliding contact with the reservoir hole 30. In other words, the sealing groove 39 is disposed in the central portion of the sliding face of the piston 34 wherein the central portion does not make contact with the end portions of the sliding face.

In this embodiment, since the sealing groove 39 is formed at the intermediate position in the axial direction of the piston 34 on its sliding face, the piston 34 can be slid stably along the reservoir hole 30. Even if the piston 34 is made compact in size, tilting and twisting of the piston 34 can be minimized.

Moreover, the spring seat 37 formed on the lower face portion 35 of the piston 34 is provided at a position in the range (T) of the sealing groove 39 formed in the piston 34 in the axial direction of the piston 34.

In this embodiment, since the spring seat 37 is provided at a position in the range (T) of the sealing groove 39 in the axial direction of the piston 34, the spring 36 can be operated at a position close to the position wherein the sliding piston packing 38 (sealing member) is provided. As a result, twisting of the piston 34 can be minimized, and a stable spring force can be applied to the piston 34.

In this embodiment, since the sealing groove 39 is formed at the intermediate position in the axial direction on the sliding face of the piston 34 and the spring seat 37 formed on the lower face portion 35 of the piston 34 is provided at the position in the range (T) of the sealing groove 39 formed in the piston 34, the ratio (S/D) of the sliding length (S) of the piston 34 to the maximum diameter (D) of the piston 34 can be set to, for example, 0.4 or less (S/D≤0.4).

Next, in this embodiment, the lid member 52 is formed of the plate member 54 and the sealing member 56. The plurality of screw holes 64 for securing the plate member 54 to the base body 12 are disposed outside the region surrounded by the sealing member 56. Furthermore, the communication passage 66 communicating with the plurality of reservoir holes 30 and 30 is provided inside the region surrounded by the sealing member 56.

Hence, in this embodiment, since the plurality of reservoir holes 30 and 30 can be hermetically sealed with the single (common) lid member 52, the number of components can be reduced and the cost of manufacturing can be lowered. As a result, in this embodiment, the lid member 52 does not protrude more than necessary from the base body 12, and this contributes to the miniaturization of the device. The sentence "the lid member 52 does not protrude more than necessary from the base body 12" means that the lid member 52 protrudes from the base body 12 by the thickness of the plate member 54 and the height dimension of the short-side ribs 62 and 62.

In addition, in this embodiment, since the long-side ribs 60 and 60 are provided for the plate member 54, the plate member 54 can have a certain strength in the long-side direction thereof. Furthermore, since the long sides of the sealing member 56 are covered with the long-side ribs 60 and 60 that are formed by simply bending the long sides of the rectangular shape of the plate member 54, the sealing member 56 disposed between the base body 12 and the plate member 54 can be protected effectively.

Furthermore, in this embodiment, since the short-side ribs 62 and 62 are provided for the plate member 54, the base body 12 can be made waterproof in the short-side direction by simply bending the short sides of the rectangular shape of the plate member 54. Moreover, since the short-side ribs 62 and 62 are made contact with the bottom face 12*f* of the base body 12, the sealing member 56 can be prevented from being deformed excessively by compression. Besides, the strength of the plate member 54 in the short-side direction can be increased by the short-side ribs 62 and 62.

Additionally, in this embodiment, when the plate member 54 is secured to the base body 12, the seat faces 70*a* of the frame portions 70 surrounding the screw holes 64 make contact with the bottom face 12*f* of the base body 12, whereby the compression amount of the sealing member 56 can be restricted. Hence, even when the plate member 54 is secured firmly with the screw members 50, the frame portions 70 formed by simple processing can effectively prevent the sealing member 56 from being compressed excessively. As a result, in this embodiment, the durability of the sealing member 56 can be improved, and the pressure on the sealing face of the ring-shaped sealing member 56 can be maintained uniformly.

Still further, in this embodiment, since the base body 12 is provided with the respiratory hole 76, the open end of which faces the inside of the sealing member 56 and communicates with the communication passage 66 and through which compressed air passing through the communication passage 66 flows in and out, the compressed air generated when the pistons 34 and 34 slide along the reservoir holes 30 and 30 can be preferably discharged to the outside via the communication passage 66 and the respiratory hole 76.

In this embodiment, although the brake control device 10 preferably used for motorcycles is taken as an example, the above-mentioned technical features can also be applied to brake control devices for four-wheel automobiles.

Next, a brake fluid pressure control device for a vehicle 100 according to another embodiment of the present invention will be described below. The same components as those of the reservoir 32 of the brake fluid pressure control device for a vehicle 10 according to the above-mentioned embodiment shown in FIG. 3 are designated by the same reference characters, their detailed descriptions are omitted, and only differences are described in detail.

Figure 8A:
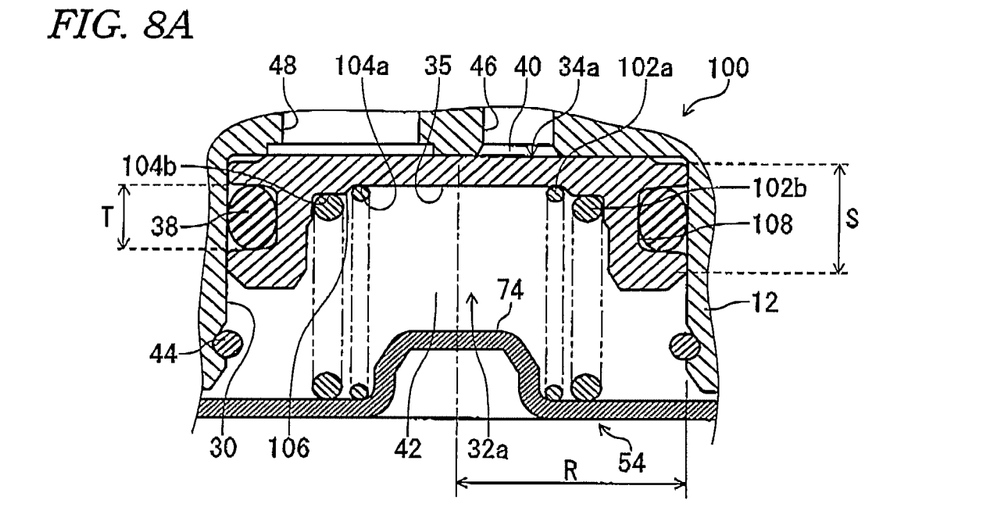
FIG. 8A is an enlarged vertical sectional view showing the reservoir of a brake fluid pressure control device for a vehicle according to another embodiment of the present invention.
Figure 8B:
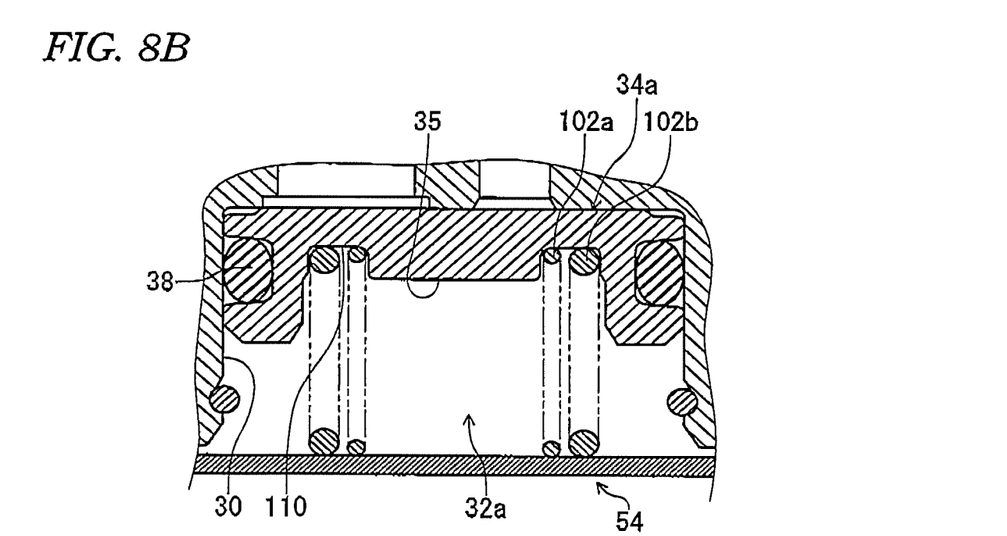
FIG. 8B is an enlarged vertical sectional view showing a reservoir according to a modified example.

FIG. 8A is an enlarged vertical sectional view showing the reservoir of the brake fluid pressure control device for a vehicle according to the other embodiment of the present invention, and FIG. 8B is an enlarged vertical sectional view showing a reservoir according to a modified example.

In this embodiment, as shown in FIG. 8A, this embodiment is different from the above-mentioned embodiment in that an inner coil spring 102*a* and an outer coil spring 102*b* are used as the springs of the device. The inner coil spring 102*a* and the outer coil spring 102*b* are disposed coaxially and doubly on the inner circumferential side and the outer circumferential side thereof inside the reservoir hole 30 of the reservoir 32*a*. In this case, the spring load of the outer coil spring 102*b* is set so as to be larger than that of the inner coil spring 102*a*.

In this embodiment, since the inner coil spring 102*a* and the outer coil spring 102*b* are used as the springs of the device, and the inner coil spring 102*a* and the outer coil spring 102*b* are disposed coaxially and doubly on the inner circumferential side and the outer circumferential side, the required deflection amounts of the inner coil spring 102*a* and the outer coil spring 102*b* in the axial direction can be made smaller than that of a single coil spring. As a result, the reservoir 32*a* can be made more compact in size, and the inner coil spring 102*a* and the outer coil spring 102*b* can be operated properly for the piston 34*a*. The phases of the winding angles of the beginning end portion and the terminating end portion of each of the inner coil spring 102*a* and the outer coil spring 102*b* may be set so as to be similar to those of the spring 36 shown in FIGS. 7A and 7B.

Furthermore, an inner seat 104*a* for receiving the inner coil spring 102*a* and an outer seat 104*b* for receiving the outer coil spring 102*b* are provided on the lower face portion 35 of the piston 34*a* that is opposed to the expanding portion 74. A ring-shaped step portion 106 is provided between the inner seat 104*a* and the outer seat 104*b*.

In this embodiment, since the position on which the inner seat 104*a* is formed is deeper (closer to the bottom face side of the reservoir hole 30) than that on which the outer seat 104*b* is formed, the inner coil spring 102*a* can be restricted from moving in a direction nearly perpendicular to the axial direction (the looseness of the spring in the left-right direction in FIG. 8A can be restricted) by virtue of the step portion 106 formed between the inner seat 104*a* and the outer seat 104*b*. As a result, the inner coil spring 102*a* and the outer coil spring 102*b* can deliver stable spring forces while the coil springs are prevented from making contact with each other.

FIG. 8B shows a modified example, i.e., a reservoir 32*b* that is not provided with the step portion 106. The components corresponding to those shown in FIG. 8A are designated by the same reference characters and described below.

In the reservoir 32*b* shown in FIG. 8B, both the inner coil spring 102*a* and the outer coil spring 102*b* are supported using a ring-shaped concave portion 110 instead of the step portion 106. On the other hand, since the step portion 106 is formed in the case of the reservoir 32*a* shown in FIG. 8A, the reservoir 32*a* is advantageous in that the cutting work for the lower face portion 35 of the piston 34*a* can be carried out easily and the cost of manufacturing can be lowered in comparison with the reservoir 32*b*.

As shown in FIG. 8A, the piston 34*a* sliding along the reservoir hole 30 is formed into a flat shape in which the sliding length (the length in the axial direction) (S) of the piston 34*a* is set so as to be smaller than the maximum radius (R) of the piston 34*a* (S<R).

In this embodiment, since the sliding length (S) of the piston 34*a* is set so as to be smaller than the maximum radius (R) of the piston 34*a* (S<R), the length of the reservoir hole 30 in the axial direction can be shortened, and the base body 12 can be made compact in size. In this case, the reservoir 32*a* can be made compact in size by virtue of the synergistic effect of the flat shape of the piston 34*a* and the fact that the spring load at the beginning end portion 103*a* of each of the inner coil spring 102a and the outer coil spring 102b is made equal to that at the terminating end portion 103b thereof owing to the phase difference between the beginning end portion 103a and the terminating end portion 103b.

Furthermore, a sealing groove 108 for accommodating the piston packing 38 is formed in the piston 34a. More specifically, the sealing groove 108 is formed at the intermediate position in the axial direction of the piston 34a on its sliding face making sliding contact with the reservoir hole 30. In other words, the sealing groove 108 is disposed in the central portion of the sliding face of the piston 34a wherein the central portion does not make contact with the end portions of the sliding face.

In this embodiment, since the sealing groove 108 is formed at the intermediate position in the axial direction of the piston 34a on its sliding face, the piston 34a can be slid stably along the reservoir hole 30. Even if the piston 34a is made compact in size, tilting and twisting of the piston 34a can be minimized.

Moreover, the inner seat 104a and the outer seat 104b formed on the lower face portion 35 of the piston 34a are provided at positions in the range (T) of the sealing groove 108 formed in the piston 34a in the axial direction of the piston 34a.

In this embodiment, since the inner seat 104a and the outer seat 104b are provided at positions in the range (T) of the sealing groove 108 in the axial direction of the piston 34a, the inner coil spring 102a and the outer coil spring 102b can be operated at positions close to the position wherein the sliding piston packing 38 (sealing member) is provided. As a result, twisting of the piston 34s can be minimized, and stable spring forces can be applied to the piston 34a.

What is claimed is:

1. A brake fluid pressure control device for a vehicle, the device comprising:
    a base body;
    a plurality of reservoirs configured to store brake fluid and provided in the base body, wherein the reservoirs are disposed in parallel; and
    a single lid member secured to the base body,
    wherein each of the reservoirs has a reservoir hole, a piston that slides inside the reservoir hole, and a spring that biases the piston,
    wherein the lid member hermetically seals the plurality of reservoir holes,
    wherein the lid member comprises a plate member with which the springs make contact and a ring-shaped sealing member held between one face of the base body to which the plate member is secured and a face of the plate member opposed to the one face of the base body so as to provide a sealing function,
    wherein, in the lid member,
        a screw hole formed in the plate member and configured to secure the plate member to the base body is disposed outside a region surrounded by the sealing member, and
        a communication passage communicating with the plurality of reservoir holes is provided inside the region surrounded by the sealing member,
    wherein the plate member is formed into a rectangle shape in a plan view and has a long-side rib formed by bending at least one of the long sides of the rectangular rectangle shape, and
    wherein, when the plate member is secured to the base body, the long-side rib is formed so as to cover at least part of one side face of the base body extending from the one face of the base body.

2. The brake fluid pressure control device for a vehicle according to claim 1,
    wherein the spring comprises an inner coil spring and an outer coil spring,
    wherein both the inner coil spring and the outer coil spring are supported using a ring-shaped concave portion on a lower face portion of the piston,
    wherein a sealing groove for accommodating a piston packing is formed in the piston at the intermediate position in an axial direction of the piston on its sliding face making sliding contact with the reservoir hole,
        wherein a central portion does not make contact with end portions of the sliding face.

3. The brake fluid pressure control device for a vehicle according to claim 1,
    wherein the plate member has a short-side rib formed by bending at least one of the short sides of the rectangle shape, and
    wherein, when the plate member is secured to the base body, the short-side rib is provided so as to make contact with the one face of the base body.

4. The brake fluid pressure control device for a vehicle according to claim 1,
    wherein the screw hole formed in the plate member has a frame portion that is formed by folding back a protruding portion formed by burring processing toward the radially outward direction so as to surround the screw hole, and
    wherein, when the plate member is secured to the base body, the frame portion makes contact with the one face of the base body, thereby restricting the compression amount of the sealing member.

5. The brake fluid pressure control device for a vehicle according to claim 1,
    wherein the base body is provided with a respiratory hole, an open end of the respiratory hole faces an inside of the sealing member and communicates with the communication passage, and gas passing through the communication passage flows in and out through the respiratory hole.

6. The brake fluid pressure control device for a vehicle according to claim 5, the device further comprising:
    a motor mounted on the base body to drive pumps incorporated in the base body, and
    a housing mounted on the base body to accommodate electrical components,
    wherein the respiratory hole and a vent hole communicating with at least one of an inside of the motor and an inside of the housing are formed in the base body so as to pass through, and
    the inside of the housing is formed so as to communicate with an outside via a breathable waterproof member.

7. The brake fluid pressure control device for a vehicle according to claim 1,
    wherein the plate member is formed of a flat plate having a flat face portion,
    wherein expanding portions expanding toward deeper sides of the reservoirs are formed on the flat face portion,
    wherein the expanding portions serve as guides for the springs.

8. The brake fluid pressure control device for a vehicle according to claim 1,
    wherein a winding beginning end portion and a winding terminating end portion of the spring are set at positions opposed to each other in a plan view from the axial direction of the spring.

9. The brake fluid pressure control device for a vehicle according to claim 8,
wherein a seat that receives the spring is provided at a position within a range of a sealing groove formed in the piston in the axial direction of the piston.

10. The brake fluid pressure control device for a vehicle according to claim 1,
wherein the piston is formed into a flat shape in which a sliding length of the piston is set to be smaller than the radius of the piston.

11. The brake fluid pressure control device for a vehicle according to claim 10,
wherein a sealing groove is formed in the piston, and
the sealing groove is formed at an intermediate position in the axial direction of the piston on a sliding face of the piston.

12. The brake fluid pressure control device for a vehicle according to claim 1,
wherein the spring comprises an inner coil spring and an outer coil spring, and the inner coil spring and the outer coil spring are disposed coaxially and doubly on the inner circumferential side and the outer circumferential side thereof.

13. The brake fluid pressure control device for a vehicle according to claim 12,
wherein an inner seat that receives the inner coil spring and an outer seat that receives the outer coil spring are provided for the reservoir,
wherein a step portion is provided between the inner seat and the outer seat.

14. The brake fluid pressure control device for a vehicle according to claim 1,
wherein a space is provided between the sealing member, at least one rib bent upwardly along the edge of the plate member, a bottom face of the base body and an upper face of the plate member.

15. The brake fluid pressure control device for a vehicle according to claim 1,
wherein the sealing member is a ring-shaped sealing member disposed and secured along a flat upper face of the plate member,
wherein the ring-shaped sealing member is formed in a figure eight pattern with the communication passage provided between circular portions of the ring-shaped sealing member,
wherein a distance portion formed by the ring-shaped sealing member between the circular portions constituting parts of the sealing member has a lateral spacing smaller than a diameter of the circular portions.

16. The brake fluid pressure control device for a vehicle according to claim 1,
wherein the plate member has opposing long-side ribs formed along each entire long side by bending at least one of the long sides of the rectangle shape,
wherein short-side ribs are formed on a part of each short side by bending at least one of the short sides of the rectangle shape.

17. The brake fluid pressure control device for a vehicle according to claim 1,
wherein the spring comprises an inner coil spring and an outer coil spring,
wherein the inner coil spring and the outer coil spring are disposed coaxially and doubly on an inner circumferential side and an outer circumferential side thereof inside the reservoir hole,
wherein an inner seat for receiving the inner coil spring and an outer seat for receiving the outer coil spring are provided on a lower face portion of the piston that is opposed to an expanding portion,
wherein a ring-shaped step portion is provided between the inner seat and the outer seat on the piston,
wherein a position on which the inner seat is formed is closer to a bottom face side of the reservoir hole than that on which the outer seat is formed,
wherein the inner coil spring is restricted from moving in a direction nearly perpendicular to an axial direction of the piston by virtue of the step portion formed between the inner seat and the outer seat.

18. A brake fluid pressure control device for a vehicle, the device comprising:
a base body;
a reservoir configured to store brake fluid and provided in the base body,
wherein the reservoir has a reservoir hole, a piston that slides inside the reservoir hole, a coil spring that biases the piston, and a spring receiving member that receives the coil spring,
wherein the piston is formed into a flat shape in which a length in the axial direction of the piston is set to be smaller than the radius of the piston,
wherein a winding beginning end portion and a winding terminating end portion of the coil spring are set at positions opposed to each other in a plan view from the axial direction of the coil spring,
wherein the piston is provided with a spring seat that receives the coil spring and a sealing groove in which a sealing member is installed,
wherein the sealing groove is formed at an intermediate position in the axial direction of the piston on a sliding face of the piston,
wherein the spring seat is provided at a position within a range (T) of the sealing groove in the axial direction of the piston,
wherein the spring receiving member includes a plate member which is formed into a rectangle shape in a plan view so as not to protrude from a bottom surface of the plate member which is positioned adjacent to a bottom face of the base body
wherein the plate member seals the bottom face of the body via a sealing member while allowing a communication between the plurality of reservoir holes.

19. The brake fluid pressure control device for a vehicle according to claim 18,
wherein the sealing groove is formed in the piston.

20. The brake fluid pressure control device for a vehicle according to claim 18,
wherein the plate member is a flat plate member having a flat face portion,
wherein an expanding portion expanding toward the deeper side of the reservoir is formed on the flat face portion,
wherein the expanding portion serves as a guide for the coil spring.

21. A brake fluid pressure control device for a vehicle, the device comprising:
a base body;
a plurality of reservoirs configured to store brake fluid and provided in the base body, wherein the reservoirs are disposed in parallel; and
a single lid member secured to the base body,
wherein each of the reservoirs has a reservoir hole, a piston that slides inside the reservoir hole, and a spring that biases the piston, wherein the lid member hermetically seals the plurality of reservoir holes, wherein the lid member comprises a plate member with which the springs make contact and a ring-shaped sealing member held between one face of the base body to which the plate member is secured and a face of the plate member opposed to the one face of the base body so as to provide a sealing function, wherein, in the lid member, a screw hole formed in the plate member and configured to secure the plate member to the base body is disposed outside a region surrounded by the sealing member, and a communication passage communicating with the plurality of reservoir holes is provided inside the region surrounded by the sealing member, wherein, in the lid member, a frame portion is formed so as to surround the screw hole, and wherein, when the plate member is secured to the base body, the frame portion makes contact with the one face of the base body, thereby restricting the compression amount of the sealing member.

* * * * *